Jan. 9, 1962 G. E. COMSTOCK 3D 3,016,207

VACUUM LOOP TAPE HANDLER

Filed Dec. 15, 1958

INVENTOR.
GEORGE E. COMSTOCK, 3RD

BY Alfred W. Barber
ATTORNEY

United States Patent Office 3,016,207
Patented Jan. 9, 1962

3,016,207

VACUUM LOOP TAPE HANDLER

George E. Comstock 3d, Huntington, N.Y., assignor to Potter Instrument Co., Inc., Plainview, N.Y., a corporation of New York Filed Dec. 15, 1958, Ser. No. 780,466
6 Claims. (Cl. 242—55.12)

The present invention concerns tape handlers and, in particular, methods of and means for maintaining desired tension on the tape at the pick-up point.

Magnetic tape is widely used for recording information in computing systems. In this application it is usually necessary to reach various points along the length of the tape very quickly. This in turn requires frequent and rapid reversal of direction of motion of the tape. Usually the tape is carried on two reels and passes from one to the other. When reversal is required, a system having considerable inertia must be decelerated in one direction and accelerated in the opposite direction. A portion of the tape representing a much smaller mass may, however, be decelerated and accelerated much more rapidly. This fact may be used to practical advantage by maintaining a slack loop between the reels of tape including the point at which the pick-up is located. Slack loops not only must allow reversal of direction of travel of the tape in a very short interval of time but must also maintain at least a minimum tension at the pick-up point. While tension arms have been used for the purpose of maintaining tension in a slack loop even more rapid reversals are required in the system than they allow.

It has been found according to the present invention that if a portion of the tape, as it passes from reel to reel over the pick-up point, is maintained in tension by a vacuum system, that tension can be maintained and at the same time low inertia characteristics are provided. According to a modification of the present invention multiple vacuum loops are provided on each side of the pick-up point wherein a considerable length of tape is contained in the vacuum loop system and tension arms may be dispensed with. The use of the vacuum loop has an additional advantage in that it relaxes the requirements in the remainder of the system, in the tension arm portions and take up reels, for example.

Accordingly one object of the present invention is to provide a tape handling system of improved operating characteristics especially in regard to its ability to reverse direction of travel.

Another object is to provide a tape handling system capable of reversing the direction of travel of the tape much more rapidly than hitherto possible.

Still another object is to provide a tape handling system in which flutter is reduced and response improved in the presence of rapid reversals of direction of the tape.

These and other objects will be apparent from the detailed description of the invention given in connection with the various figures of the drawing.

In the drawing is a diagrammatic representation of one form of the present invention.

Figures 1, 2, 3:
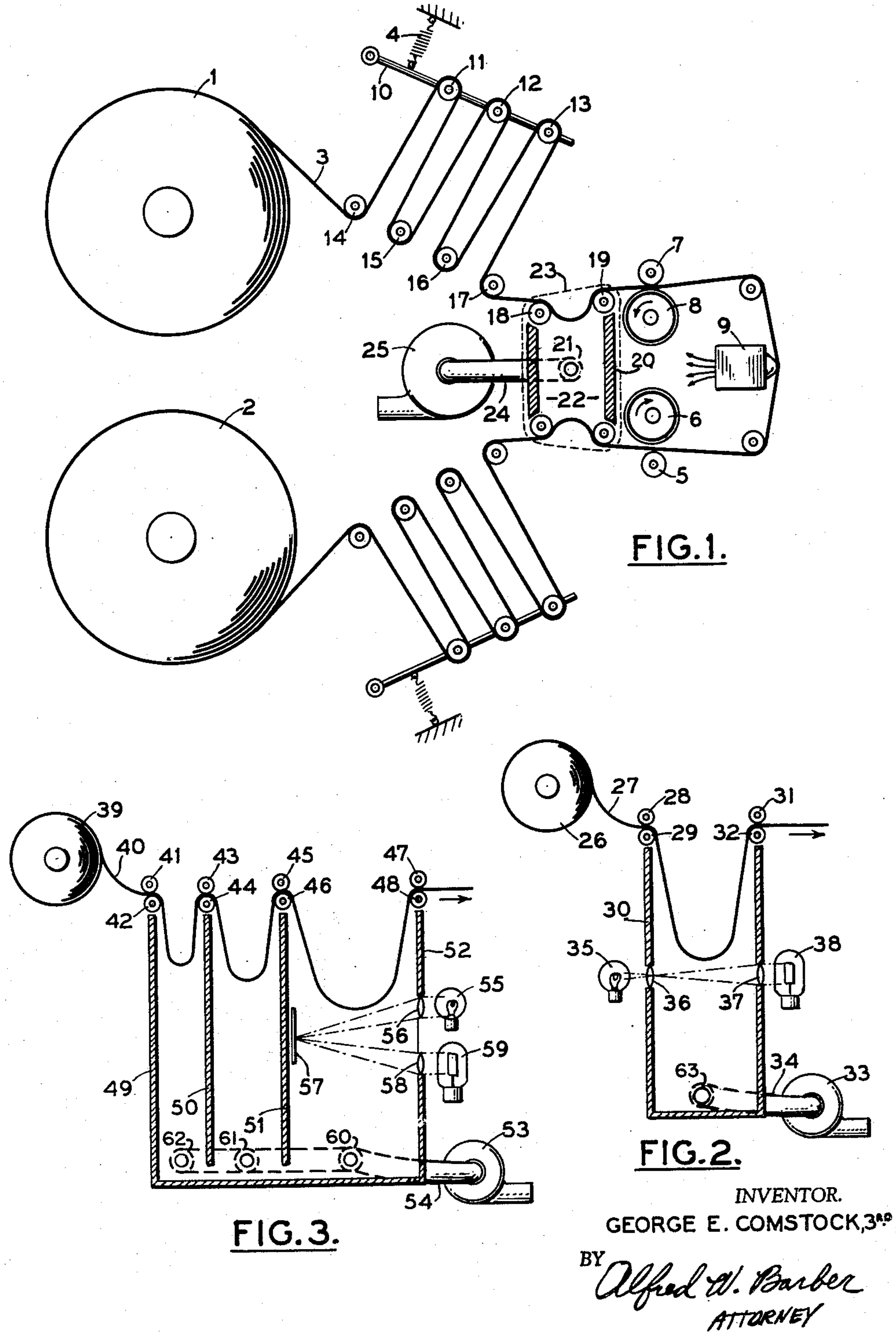
FIG. 2 is a diagrammatic representation of a modified form of vacuum tape loop and control in accordance with the present invention.
FIG. 3 is a diagrammatic representation showing another modification of the vacuum loop and control in accordance with the present invention.

FIG. 1 shows tape reels 1 and 2 with magnetic tape 3 passing therebetween. Tape 3 passes over a pick-up point consisting of record-play-back head 9 between idler-drive roll pairs 5—6 and 7—8 in which one direction of travel is produced when drive roll 6 pinches tape to idler 5 and the reverse direction when drive roll 8 pinches tape to idler 7 as shown by the arrows. At the same time take up reels 1 and 2 are rotated in the corresponding directions to feed tape in one direction and take up in the other. The particular details of the drive roll and take up roll drives is not as shown as it will be understood that the invention applies equally for any suitable drive mechanism. Tension arms are provided as the first order means of keeping the tape under tension as shown as the tape leaves or enters each take-up reel. For example, arm 10 tensioned by spring 4 holds tape 3 under tension as it passes over idler rollers 11—12—13—14—15—16—17. As the tape 3 passes over additional rollers between the tension arms and the drive rolls it passes over two sides of vacuum chamber 22 having walls 20—21 maintained at a predetermined separation and from which air is drawn through a duct 24 by suitable vacuum producing means such as blower 25. The partial vacuum thus produced pulls tape 3 into chamber 22 from both sides over rollers 18—19 on one side and similar corresponding rollers not numbered on the other side to provide a vacuum tensioned slack loop in the tape path on each side of head 9. When sudden reversals of direction of tape travel are produced as by shifting the drive from roller 8 to roller 6, the vacuum loops yield or take up tape practically instantaneously since the inertia of the tape in the path from vacuum loop to vacuum loop over the head is extremely low. After the initial very short interval of time the tension arms start to operate to maintain tension and still later the reels 1 and 2 come into play. As the motion of the tape speeds up tape is withdrawn from the vacuum chamber on one side and as it is withdrawn it transmits increasing tension to the tension arms until equilibrium is reestablished.

FIG. 2 shows a modified vacuum loop including loop position detecting means. In this form tape 27 is fed from reel 26 between rollers 28 and 29 into a vacuum tank 30 which is maintained in a condition of partial vacuum by suitable means such as blower 33 drawing air from the tank over pipe 34. Means for detecting the position of the loop in the tank is provided in the form of an optical detector consisting of lamp 35 passing through the tank by means of lenses 36 and 37 to pick-up photo-electric cell 38. Since tank 30 may be made of considerable size, a much greater length of tape may be held in the vacuum loop storage providing for a much longer time for reversal of the reels with respect to the normal running linear tape speed.

FIG. 3 shows another form of vacuum loop system in which reel 39 feeds tape 40 between rollers 41—42, 43—44, 45—46 and 47—48. Between rollers 41—42 and 43—44 the tape loops into a tank formed by walls 49 and 50 under the influence of suction created by blower 53 the input of which connects with the various tanks by means of connecting pipe 54. Also a second loop is formed between rollers 43—44 and 45—46 in tank formed by walls 50 and 51 and a third loop is formed between rollers 45—46 and 47—48 in the tank formed by walls 51 and 52 all pulled by the suction from the input to blower 53. The position of any one or more of the loops may be detected and the information obtained used to control the drive to reel 39, as for example, the detector of the third loop position provided by lamp 55 shining through lens 56, reflected by mirror 57 through lens 58 to photo-electric cell 59. As the third loop intercepts this light the current in the photo-electric cell is affected and this varying current is utilized in reel drive control apparatus. It will be seen that the three vacuum tanks shown are of graduated sizes which has been found preferable to making them all of equal size.

It has been found that the vacuum connection to the vacuum chambers should draw air out in a direction of the plane of the surface of the tape to minimize sucking the tape into the vacuum line. This is shown in FIG. 1 by the placement of opening 21 which is the open end of the pipe 24 from blower 25. In FIG. 2 opening 63 connects pipe 34 from the blower 33 to the vacuum chamber. In FIG. 3 openings 60, 61 and 62 connect pipe 54 from blower 53 to the three vacuum chambers so that air is drawn across the narrow dimension of the tape.

While only a few modifications of the present invention have been shown and described, many modifications will be apparent to those skilled in the art and within the spirit and scope of the invention as set forth in particular in the appended claims.

What is claimed is:

1. In a tape handling system with progressive control means, the combination of, a pair of reels for receiving and for paying out tape, a recording/playback head, a pair of multiple loop tension arms, one on each side of said head for providing tensioned tape loops between said reels and said head, a pair of tape driving rollers, one on each side of said head for pulling said tape in forward and reverse directions across said head, and a double ended vacuum chamber including a tape receiving opening on each side of said head for maintaining tension on said tape as it passes from said driving rollers to said tension arms.

2. In a tape handling system with progressive control means, the combination of, a pair of tape storage reels of large capacity and large inertia for receiving and paying out tape, a record/playback head, a pair of multiple loop tension arms of intermediate storage capacity and intermediate inertia, one on each side of said head for providing tensioned tape loop storage between said reels and said head, a pair of tape driving rollers one on each side of and adjacent to said head for pulling tape in forward and reverse directions across said head, and vacuum chamber means of low storage capacity for maintaining low inertia tensioning of said tape, as it passes from said driving rollers to said tensioning arms.

3. In a tape handling system as set forth in claim 1 wherein said pair of tape driving rollers are positioned one on each side and adjacent said head, and said vacuum chamber is positioned intermediate said tape driving rollers and said tension arms.

4. In a tape handling system as set forth in claim 1 including substantially friction-free tape guide means adjacent said vacuum chamber.

5. In a system with progressive control means for handling tape on which information is processed comprising a pair of reels for receiving and paying out tape, a record/playback head, a pair of multiple loop tension arms, one on each side of said head for providing tensioned tape loops between said reels and said head, tape driving means adjacent said head for moving tape in forward and reverse directions across said head, and a double ended vacuum chamber including a tape-receiving opening on each side of said head for maintaining tension on said tape as it passes said head.

6. In a tape handling system with progressive control means, the combination of, a pair of reels for receiving and for paying out tape, a recording/playback head, a multiple loop tension arm to provide tensioned tape loops between one of said reels and said head, tape driving means to drive tape in at least one direction between said reels, and a vacuum chamber including a tape receiving opening on one side of said head for maintaining tension on a tape as it passes from said tape driving means to said tension arm.

References Cited in the file of this patent

UNITED STATES PATENTS

| | | |
|---|---|---|
| 2,778,634 | Gams et al. | Jan. 22, 1957 |
| 2,875,874 | Foret et al. | Mar. 3, 1959 |
| 2,893,653 | Schultheis et al. | July 7, 1959 |
| 2,927,789 | Walsh et al. | Mar. 8, 1960 |

FOREIGN PATENTS

| | | |
|---|---|---|
| 296,728 | Great Britain | Aug. 15, 1929 |
| 1,163,105 | France | Apr. 21, 1958 |
| 847,821 | Great Britain | Sept. 14, 1960 |